United States Patent [19]

Oldfelt et al.

[11] Patent Number: 4,713,847
[45] Date of Patent: Dec. 22, 1987

[54] VACUUM TOILET SYSTEM

[75] Inventors: Sven Oldfelt, Vaxholm; Sigvard Söderström, Hägersten, both of Sweden

[73] Assignee: Oy Wärtsilä Ab, Helsinki, Finland

[21] Appl. No.: 9,709

[22] Filed: Feb. 2, 1987

[51] Int. Cl.4 ...................... B64D 11/02; E03D 11/00
[52] U.S. Cl. .......................................... 4/316; 4/431; 4/317; 4/434; 251/61.1; 137/192; 137/205
[58] Field of Search .................... 4/316, 317, 434, 435, 4/431, 216, 321, 323, 406, 300; 137/205, 399, 192; 251/61.1

[56] References Cited

U.S. PATENT DOCUMENTS

| | | | |
|---|---|---|---|
| 3,329,974 | 7/1967 | Belasco | 4/316 |
| 3,482,267 | 12/1969 | Liljendahl | 4/431 |
| 3,686,693 | 8/1972 | Liljendahl | 137/205 |
| 3,746,032 | 7/1973 | Wallgren | 137/192 X |
| 3,811,135 | 5/1974 | Drouhard, Jr. et al. | 4/435 |
| 3,995,328 | 12/1976 | Cowolan et al. | 4/216 X |
| 4,063,315 | 12/1977 | Carolan et al. | 4/316 |
| 4,202,061 | 5/1980 | Waters | 4/317 |
| 4,275,470 | 6/1981 | Badger et al. | 4/316 |
| 4,357,719 | 11/1982 | Badger et al. | 4/316 |

Primary Examiner—Henry K. Artis
Attorney, Agent, or Firm—Dellett, Smith-Hill and Bedell

[57] ABSTRACT

A vacuum toilet system comprises a waste-receiving bowl having an outlet, a sewer pipe that can be placed at a pressure that is lower than that in the interior of the waste-receiving bowl, and a discharge valve connected between the sewer pipe and the outlet of the waste-receiving bowl for controlling passage of material from the waste-receiving bowl to the sewer pipe. The discharge valve comprises a valve housing and a closure member. The closure member is movable relative to the valve housing between an pen position and a closed position. A drive mechanism is connected to the closure member for bringing about movement thereof relative to the valve housing. A sensing device provides a control signal in the event that the drive mechanism is not able to cause the closure member to attain its closed position. A control device is connected to the drive mechanism and responds to a user stimulus by causing the drive mechanism to move the closure member from its closed position to its open position and subsequently from its open position towards its closed position. The control device responds to a control signal provided by the sensing device by causing the drive mechanism to move the closure member towards its open position and subsequently towards its closed position.

14 Claims, 5 Drawing Figures

VACUUM TOILET SYSTEM

This invention relates to a vacuum toilet system.

BACKGROUND OF THE INVENTION

Vacuum toilet systems have been known for many years. British Patent Specification No. 902,871 published Aug. 9, 1962 (Liljendahl) discloses an early vacuum toilet system. The system disclosed in U.S. Pat. No. 3,239,849 issued Mar. 15, 1966 (Liljendahl) may be regarded as the forerunner of the modern vacuum toilet system. Variations on the system disclosed in these early publications can be found in U.S. Pat. Nos. 4,275,470 (Badger et al), 4,357,719 (Badger et al) and 3,996,628 (Mollerstedt).

The modern vacuum toilet system comprises a waste-receiving bowl, a container that can be maintained under a pressure that is substantially lower than that in the interior of the waste-receiving bowl, and a sewer pipe that connects the waste-receiving bowl to the container. It is also known to interpose a sluice device between the sewer pipe and the container, and maintain the sewer pipe under reduced pressure while the container remains at atmospheric pressure. The sewer pipe may also be put under reduced pressure only for the time needed to transport waste to the container. In all cases, a discharge valve is provided for controlling passage of material from the waste-receiving bowl into the sewer pipe. The valve may be, for example, a gate valve as shown in U.S. Pat. No. 3,239,849, or a pinch valve as shown in U.S. Pat. No. 3,984,080 (Varis et al). The system also comprises a source of rinse water and a rinse water valve for controlling introduction of rinse water into the bowl.

In operation of a conventional vacuum toilet system, a user initiates the flushing operation, e.g. by actuating a flush control switch, and the sequence of steps that constitutes the flushing operation is performed automatically. The rinse valve is opened to rinse the bowl and the discharge valve is opened to empty the bowl. Waste material in the waste-receiving bowl is propelled by atmospheric pressure past the discharge valve and into the sewer pipe, because the sewer pipe is under partial vacuum. After a predetermined time that is estimated to be sufficient to remove substantially all the waste material from the bowl, the discharge valve is closed. Depending on the length of the sewer pipe, the waste material may be transported all the way to the container before the discharge valve is closed, but this is not essential. The rinse water valve may remain open for a short time after the discharge valve has closed, if it is desired to provide a pool of clean water in the bottom of the bowl.

If a solid object falls in the waste-receiving bowl, it may interfere with proper operation of the discharge valve, e.g. by preventing the valve from closing. Nearly all obstructions of this kind can be cleared by repeating the flushing operation. Hitherto, it has been necessary for the user or an attendant to actuate the flush control switch manually in order to initiate a second flushing operation so as to remove the obstruction. This is inconvenient, and moreover a user of the vacuum toilet system might not be familiar with the correct procedure.

It has for many years been conventional to use recirculating toilet systems in aircraft. This is subject to the disadvantage that recirculating toilet systems employ recirculating liquids that are corrosive, and accordingly leakage from the system may enable the corrosive liquid to contact structural members of the aircraft, resulting in the structural integrity of the aircraft being impaired. Recirculating systems are used in aircraft because of the relatively large amount of liquid required to transport the waste material in a gravity toilet system. Vacuum toilet systems do not lend themselves to recirculation, because of the large pressure difference between the downstream side of the discharge valve and the upstream side of the rinse water valve. However, because vacuum toilet systems rely on vacuum for removal of the waste material from the bowl, the amount of rinse liquid that is needed in a vacuum toilet system is much smaller than the amount of rinse liquid required in a gravity toilet system. Consequently, non-recirculating vacuum toilet systems employing water as rinse liquid are attractive for use in aircraft.

The aircraft vacuum toilet system described in U.S. Pat. No. 4,275,470 is subject to the disadvantage that the movable element of the discharge valve is a flexible diaphragm positioned at the exterior of a curve in a pipe that connects the waste-receiving bowl to the sewer pipe. If a solid object falls in the waste-receiving bowl and the discharge valve is subsequently opened, the solid object is propelled at quite a high speed through the discharge pipe, and the flexible membrane is precisely in the trajectory of the solid object. Accordingly, the diaphragm is liable to be struck and damaged by the solid object. It is, therefore, desirable to avoid the use of flexible membranes in the discharge valve of a vacuum toilet system, particularly in the case of an aircraft vacuum toilet system where safety is critical.

A gate valve having a displaceably-reciprocating closure member is not suitable for use as the discharge valve in a vacuum toilet system, because solid material that might enter the valve housing is liable to be trapped between the leading edge of the closure member and a wall of the housing and ultimately interfere with the proper operation of the valve.

Conventionally, the discharge valve of a vacuum toilet is operated by means of the pressure difference provided by the vacuum. Electrical operation of the valve is feasible as well, but use of an electrically-operated valve and a solenoidoperated rinse water valve in a vacuum toilet system that operates in accordance with the conventional sequence of steps is subject to the disadvantage that both the discharge valve motor and the rinse water valve solenoid draw current at the same time.

SUMMARY OF THE INVENTION

A preferred embodiment of a first aspect of the present invention is a vacuum toilet system comprising a waste-receiving bowl having an outlet, a sewer pipe that can be placed at a pressure that is lower than that in the interior of the waste-receiving bowl, and a discharge valve connected between the sewer pipe and the outlet of the waste-receiving bowl for controlling passage of material from the waste-receiving bowl to the sewer pipe. The discharge valve comprises a valve housing and a closure member. The valve housing defines an upstream passage portion that is connected to the outlet of the waste-receiving bowl and a downstream passage portion that is connected to the sewer pipe. The closure member is movable relative to the valve housing in a first direction towards a position in which the discharge valve is open and in a second direction towards a position in which the discharge valve is closed. A drive mechanism is connected to the closure member for bringing about movement thereof relative to the valve housing. A sensing device senses whether the drive mechanism is able to move the closure member from its open position to its closed position, and provides a control signal in the event that the drive mechanism is not able to cause the closure member to attain its closed position. The vacuum toilet system further comprises a control device which is connected to the drive mechanism and responds to a user stimulus by causing the drive mechanism to move the closure member from its closed position to its open position and subsequently from its open position towards its closed position. The control device responds to a control signal provided by the sensing device by causing the drive mechanism to move the closure member towards its open position and subsequently towards its closed position.

In accordance with a second aspect of the invention a vacuum toilet system has a discharge valve comprising a valve housing that defines a passageway for providing communication between the outlet of a waste-receiving bowl and a sewer pipe, and a disc that is mounted in the valve housing and defines an aperture. The disc is rotatable relative to the valve housing between an open position in which the aperture is aligned with the passageway defined by the valve housing and a closed position in which the aperture in its entirety is angularly spaced from the passageway.

A preferred embodiment of the invention in a third aspect is a vacuum toilet system comprising an electrically-operated discharge valve for controlling passage of material between a waste-receiving bowl and a sewer pipe, and an electricallyoperated rinse water valve for controlling supply of rinse water to the waste-receiving bowl. A controller is connected to the discharge valve and the rinse water valve and is responsive to a user stimulus to cause operating current to be supplied to the rinse water valve to open the rinse water valve, cause supply of operating current to the rinse water valve to be interrupted, and subsequently to cause operating current to be supplied to the discharge valve.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
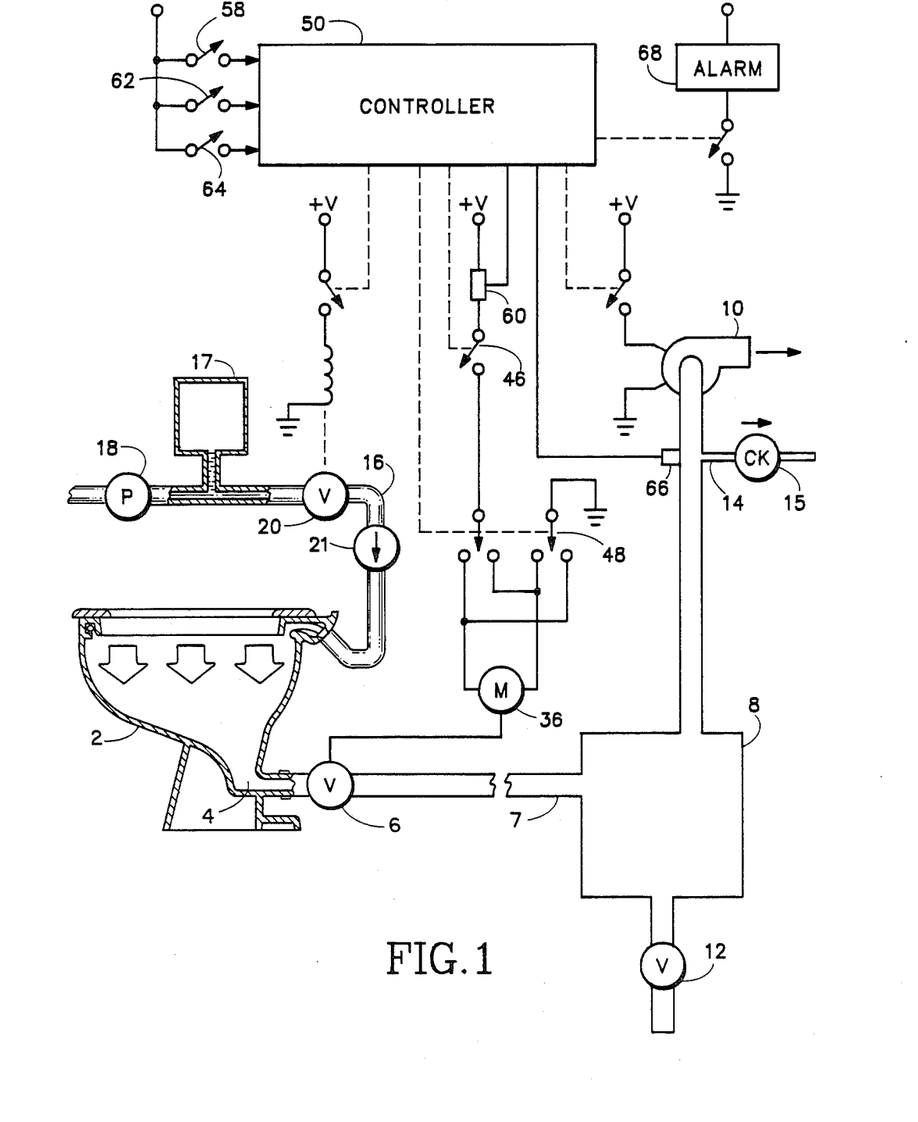
FIG. 1 illustrates diagrammatically a vacuum toliet system embodying the present invention.

The vacuum toilet system illustrated in FIG. 1 of the drawings is designed to be installed in a pressurized aircraft and comprises a waste-receiving bowl 2 that defines an interior space for receiving waste material and has an outlet opening 4. The outlet opening is connected to one side of a discharge valve 6. The opposite side of the discharge valve is connected through a sewer pipe 7 to a holding tank 8. The discharge valve 6 controls flow of material from the bowl 2 to the tank 8. An electrically-driven blower 10 is connected to the tank 8 for establishing a partial vacuum in the tank. The tank is also provided with a valve 12 for emptying the tank. A duct 14 provides communication between the interior of the tank and the ambient atmosphere, subject to the action of a check valve 15.

A rinse water supply pipe 16 opens into the bowl 2 adjacent its rim. The rinse water supply pipe 16 is connected to a source of water under pressure. The source may be, for example, an electric water pump 18 that is connected to a water supply tank and operates under control of a pressure sensor (not shown) located immediately downstream of the pump 18 to maintain the pressure in the pipe 16 at a predetermined level. A remotecontrolled, preferably solenoid-operated, rinse water valve 20 is connected in the water supply pipe 16, and an air cushion device 17 is connected to the pipe 16 between the pump 18 and the valve 20. A vacuum breaker valve 21 is disposed downstream of the valve 20, to prevent reverse flow in the pipe 16 in the event that the pressure upstream of the valve 21 falls below ambient pressure.

The discharge valve 6 is a motor operated disc valve (FIGS. 2 and 3) comprising a housing 22 including two generally circular side plates 22a and 22b. The two side plates are each formed with a circular opening, and the openings are aligned so as to define a cylindrical passageway 24. Between the two side plates of the housing 22 is a stainless steel disc 26. The disc 26 extends partially within a cavity 28 which is defined between the two side plates, and projects across the passageway 24. The disc is keyed to a shaft 30 having an end that projects from the housing 22. The shaft 30 is rotatable relative to the housing about its central axis. The disc is formed with a circular opening 32 which is of approximately the same diameter as the passageway 24 and is radially positioned so that in one angular position of the disc, the opening 32 provides communication between the upstream and downstream portions of the passageway 24. In another angular position of the disc, the disc blocks the passageway 24.

Figures 2, 3:
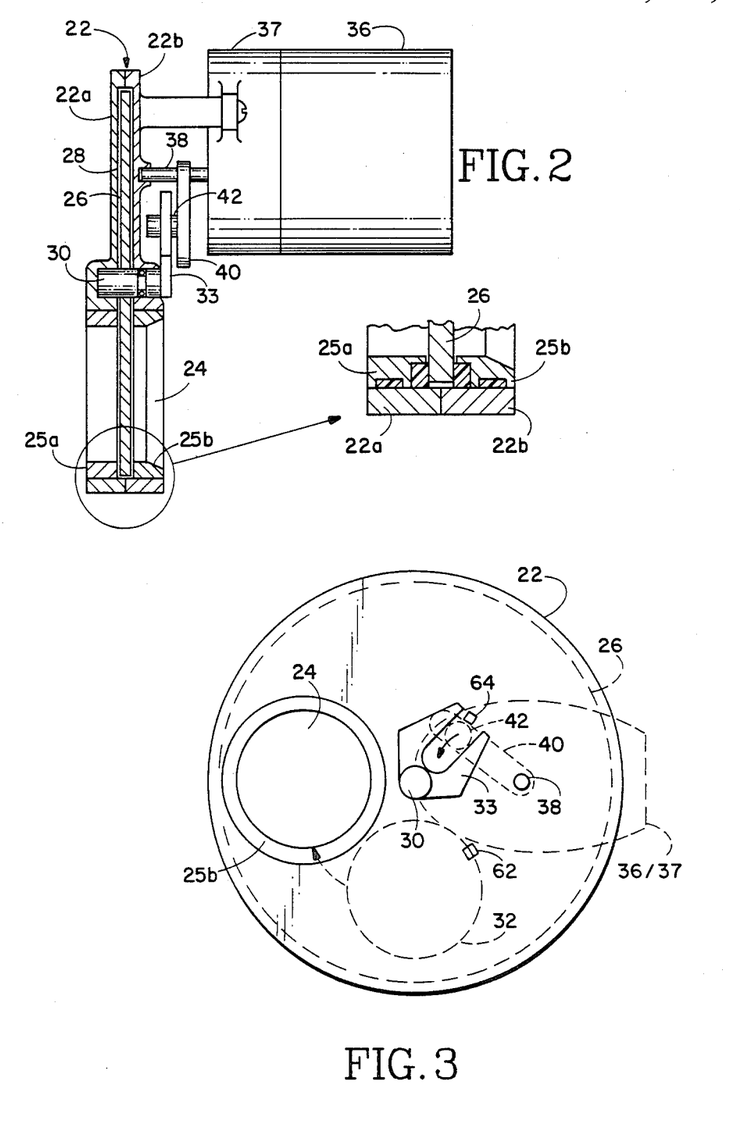
FIG. 2 is an enlarged sectional view of the discharge valve of the FIG. 1 system.
FIG. 3 is an elevation of the discharge valve.

Annular bushings 25a and 25b are fitted in the openings defined by the two side plates 22a and 22b respectively. The bushings are made of stainless steel and are each formed with grooves in which sealing rings of synthetic polymer material, such as the material sold under the trademark TEFLON, are fitted. The sealing rings ensure that a tight seal is provided between the opening 4 and the sewer pipe 7 when the disc 26 is in the closed position and also prevent entry of material into the cavity 28.

At its projecting end, the shaft 30 carries a fork 33 which extends generally radially of the shaft 30. As shown in FIG. 3, the fork has two arms which define a slot therebetween.

The disc 26 is driven by a D.C. electric motor 36 which is coupled through a gearbox 37 to an output shaft 38. The motor and gearbox assembly may, as schematically indicated, be carried by the housing 22. The shaft 38 carries an actuator arm 40, and at its end farther from the shaft 38 the arm 40 carries a stub 42 which fits in the slot defined by the fork 33. The motor is constrained to rotate the arm 40 through an arc of about 90 degrees. As the arm rotates, the stub 42 travels within the slot defined by the fork 33 and causes the shaft 30, and the disc 26 attached thereto, to rotate between an open position in which the opening 32 is aligned with the upstream and downstream portions of the passageway 24 and a closed position in which the passageway is blocked by the disc 26. The orientation of the discharge valve is such that when the disc is rotated from the closed position towards the open position, the opening 32 first provides communication between the upstream and downstream portions of the passageway 24 at a location which is below the horizontal diameter of the passageway, preferably at least 30° below the horizontal diameter, so that the vacuum in the sewer pipe 7 is applied to liquid or solid material in the discharge passageway 4, rather than to air.

The edges of the disc surrounding the opening 32 have a shearing action with the portions of the bushings 25a and 25b that bound the passageway 24, so that stringy or fibrous material that might tend to obstruct the rotation of the disc is cut. Material that enters the cavity 28 of the housing does not become trapped therein, because the disc is not displaced but only rotated angularly. Therefore, if material builds up inside the cavity it cannot be compressed against the wall of the valve housing, because the circular disc does not reciprocate relative to any portion of the valve housing. Hence, material entering the cavity 28 can always escape by entering the opening 32 when the valve is closed and then being carried into the passageway 24 when the valve opens.

The motor 36 is connected to a source of DC voltage by way of two switches 46 and 48 (FIG. 1). The switch 46 is an on-off switch and the switch 48 is a double pole, double throw switch. If the switch 46 is in its conductive condition, then in one position of the switch 48, (the valve-open position) the motor is driven in the direction to open the valve 6 while in the other position of the switch 48 (the valve-close position) the motor is driven in the direction to close the valve 6. If the switch 46 is in its non-conductive condition, the motor 36 is isolated from the voltage source and therefore is not driven.

The states of the blower 10, the valve 20 and the motor 36 are determined by the condition of a controller 50. The controller has five inputs, provided respectively by a user-operated flush control switch 58, a current sensor 60, two limit switches 62 and 64, a pressure sensor 66, and also has five outputs. Two of the outputs control switches which are connected to the blower 10 and the rinse water valve 20 for establishing the respective states thereof, two outputs control the switches 46 and 48 for establishing the state of the motor 36, and the fifth output controls a switch which is connected to a visible and/or audible alarm 68.

The two limit switches 62 and 64 are carried on the valve housing 22 such that they are engaged when the arm 40 arrives at its valve open position and its valve closed position respectively. The pressure sensor 66 is mounted in the exhaust duct leading from the tank 8 to the blower 10, and measures the pressure difference existing between the aircraft cabin and the tank 8. In order to carry out a flushing operation, the pressure in the tank 8 must be lower than that in the aircraft cabin. Each time flushing is initiated, the pressure sensor checks whether there is sufficient vacuum in the tank 8. If the pressure difference between the tank 8 and the aircraft cabin is more than about 23 cm Hg, the flushing cycle commences substantially immediately, whereas if the pressure difference is less than about 23 cm Hg the blower starts and the flushing cycle commences after a short time delay, to allow the blower to reduce the pressure in the tank to a sufficient extent for there to be a high degree of reliability that the normal flushing cycle will be completed.

Figure 4:
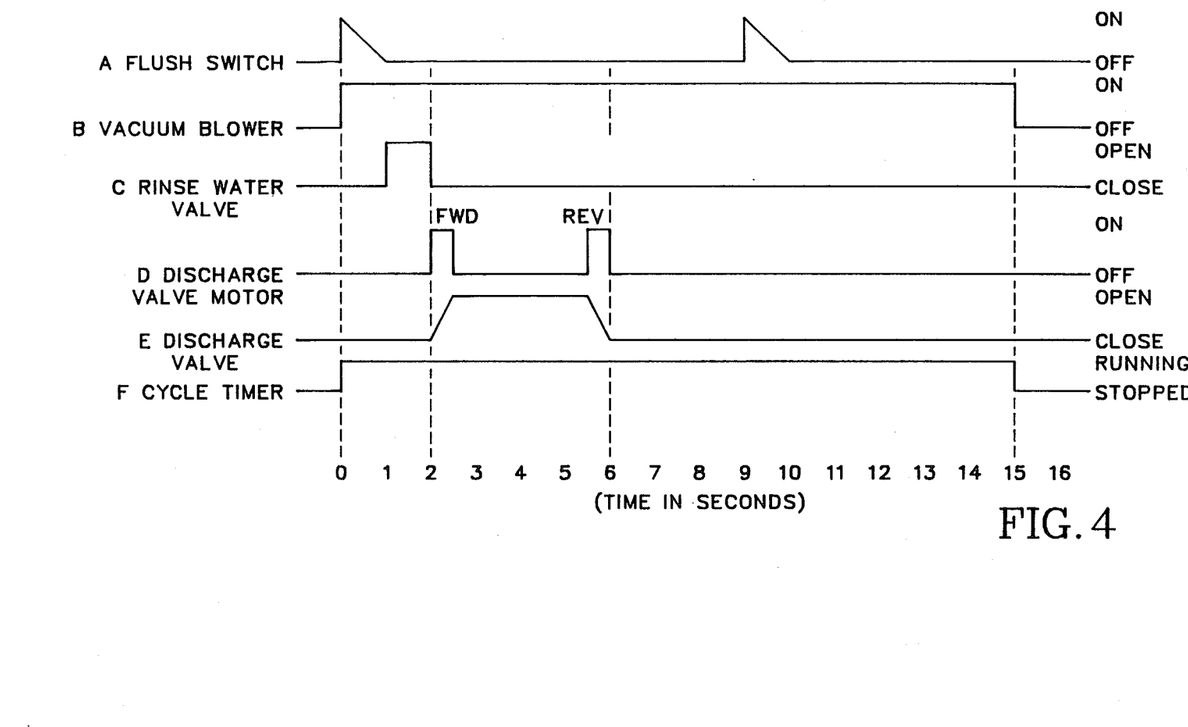
FIGS. 4 and 5 are timing diagrams for illustrating operation of the FIG. 1 system.

FIG. 4 indicates the normal sequence of operation of the FIG. 1 system. In the quiescent state of the vacuum toilet system, the blower 10 is not running, the valves 6 and 20 are closed, the switch 46 is in its non-conductive condition and the switch 48 is in the open position. In this state, a user of the system may initiate a flushing operation by momentarily closing the switch 58. The controller 50 responds to closing of the switch 58 by starting a cycle timer, and on starting of the cycle timer the blower 10 is activated (unless the sensor 66 is providing a blower-disable signal). See FIG. 4, waveforms A, B and F. The cycle timer also inhibits the input provided by the switch 58 so that a second actuation of the switch 58 during a limited inhibit time will have no effect on the controller.

About 1 s after starting the cycle timer, the controller 56 provides an output to cause the rinse water valve 20 to open (waveform C). The controller 50 maintains the valve 20 in its open condition for a predetermined time, e.g. about 1 s. This time is sufficient to provide adequate rinse water. The amount of rinse water may be as little as 0.2 l, which is substantially less than the amount of rinse liquid required to carry out a flushing operation with a conventional recirculating toilet system. When supply of current to the rinse water valve 20 has been interrupted, the controller provides a signal to place the switch 46 in its conductive condition. Since the switch 48 is in the valve-open position, the motor 36 rotates the disc 26 towards the open position. Waveforms D and E. The arm 40 engages the limit switch 62 when the disc arrives at the position in which the aperture 28 is aligned with the passageway 24, and upon detecting closing of the limit switch 62 the controller 50 places the switch 46 in its non-conductive condition and thereby interrupts supply of current to the motor 36, and also transfers the switch 48 to the valve-close position. Rotation of the disc from its closed position to its open position takes approximately 0.5 s. When the discharge valve 6 is in its open position, the vacuum established in the tank 8 by the blower 10 (or by external conditions) is communicated to the waste-receiving bowl by way of the sewer pipe 7 and the valve 6, and waste material and rinse water in the bowl are rapidly drawn from the bowl, past the valve 6. After about 3 seconds, the controller places the switch 46 in its conductive condition, and accordingly the motor rotates the disc in the closing direction. The limit switch 64 is engaged when the disc attains its closed position. The controller responds to closing of the switch 64 by placing the switch 46 in its non-conductive condition so as to stop the motor, and transferring the switch 48 to its valve-open position.

The timer continues to run until about 15 seconds after actuation of the switch 58, and then stops. At this point, the blower drive signal is removed and the blower stops (assuming that the blower 10 was not disabled by the controller in response to a blower-disable signal) and the inhibit on the input provided by the switch 58 also is removed. A further flushing operation can then be started by actuating the switch 58.

Figure 5:
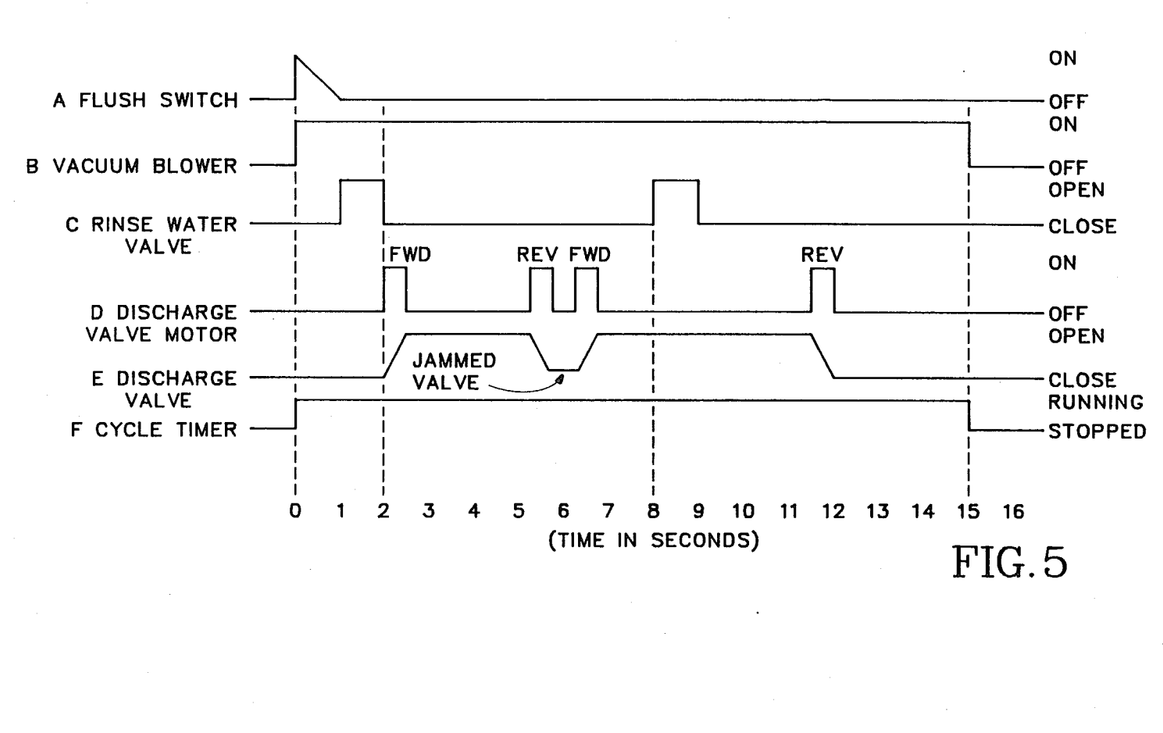

FIG. 5 illustrates the sequence of operations that occurs in the event that an object is positioned in the aperture 24 at the time that the disc 26 is driven to close the discharge valve, and the object stops the disc rotating so that the valve cannot be closed and the flushing cycle cannot proceed to its normal conclusion. This is undesirable, because it interferes with normal use of the toilet system. Also, in the case of a toilet system installed in an aircraft, failure to close the discharge valve may eventually cause an undesirable reduction in cabin pressure. It has been found that a very large proportion of obstructions in the discharge valve of a vacuum toilet system are cleared by a single additional flushing operation. Therefore, the illustrated system is designed to detect the presence of an obstruction that prevents closure of the flush valve and to carry out at least one additional flushing operation automatically.

When the disc 26 encounters the obstruction and stops rotating before it reaches its closed position, the current drawn by the motor 36 will increase to its locked rotor value. The current drawn by the motor is sensed by the current sensor 60, and in the event that the current drawn by the motor, as sensed by the sensor 60, exceeds a limit value for a predetermined time, such as to indicate that rotation of the disc is being prevented, the controller 50 initiates a valve clearing operation, by opening the switch 46, transferring the switch 48 to its valve-open position, and then closing the switch 46 once more. See waveform D of FIG. 5. The motor 36 responds by opening the discharge valve. The controller also causes the rinse water valve 20 to open for about 1 s so that rinse water is supplied to the bowl while the discharge valve is open in order to assist in removing the obstruction from the discharge valve. The discharge valve remains in its open position for approximately 3 s after the rinse water valve closes and the controller will then cause the motor 36 to drive the valve disc 26 towards its closed position. In the event that this valve clearing operation has not succeeded in removing the obstruction, the controller will actuate the alarm 68.

It will be appreciated that the present invention is not restricted to the particular embodiment that has been described and illustrated, and that variations may be made therein without departing from the scope of the invention as defined in the appended claims and equivalents thereof. For example, the invention is not restricted to use with a disc valve, since the problem of obstructions arises also if other valve types are used. Many of the advantages that arise from use of a rotatable disc as the valve closure member are also obtained if the valve closure member is a rotatable sphere or cylinder. The precise sequence of operations that is carried out in response to jamming of the discharge valve is not critical, so long as the discharge valve is opened. For example, the normal flushing cycle may be repeated. Also, the number of times the valve clearing operation is carried out is not critical. It is not essential that the discharge valve be positioned directly at the outlet of the bowl 2, since the outlet may be connected to the discharge valve by a discharge pipe. However, it is desirable that the transport distance between the bowl outlet and the discharge valve be short in order to avoid the need for an odor seal between the bowl outlet and the discharge valve and to facilitate installation of the bowl and the discharge valve as a unit. Although only one bowl 2 and valve 6 are shown in FIG. 1, a normal vacuum toilet system would include several waste-receiving bowls, each connected to the tank 8 through its own discharge valve, and the discharge valves and rinse water valves would be controlled by a single controller. In some cases, particularly in aircraft vacuum toilet systems, it may be desirable to provide dual control circuits in order to increase reliability. A handle may be attached to the disc 26 to allow manual actuation of the discharge valve.

It is not essential to use an electrically-driven blower to create the partial vacuum in the tank 8, and other types of vacuum generator, such as an electrically-driven vacuum pump or an ejector pump driven by compressed air, may be used instead. It is not essential to control operation of the vacuum generator in response to the pressure difference existing between the tank and the aircraft cabin. For example, an altitude switch may be employed to prevent operation of the vacuum generator at altitudes above 16,000 feet. It is not essential that the vacuum generator be capable of maintaining the entire volume of the tank under partial vacuum since, as noted previously, the tank may be under ambient pressure if the sewer pipe can be maintained under partial vacuum and a suitable sluice device is interposed between the sewer pipe and the tank. The arrangement of the pump 18 and the air cushion device 17 is only one possible way of providing a source of water under pressure. Alternatively, for example, the pipe 16 may be connected to the aircraft's potable water tank and the water in the tank may be pressurized by introducing air under pressure into the tank. Finally, it will be understood that the invention is not restricted to operation with D.C. voltage sources, and that specific time values are given by way of example and not limitation.

We claim:

1. A vacuum toilet system comprising a waste-receiving bowl defining an interior space for receiving waste material and having an outlet, a sewer pipe defining an interior space that can be placed at a pressure that is lower than that in the interior space of the waste-receiving bowl, and a discharge valve connected between the sewer pipe and the outlet of the waste-receiving bowl for controlling passage of material between the waste-receiving bowl and the sewer pipe, said discharge valve comprising valve portions that are movable selectively relative to one another between an open position in which the valve is open and a closed position in which the valve is closed, and a drive mechanism that acts on at least one of said valve portions for bringing about relative movement of said valve portions, and the system further comprising sensor means for sensing whether the drive mechanism is able to bring the valve portions to the closed position and providing a control signal in the event that the drive mechanism is unable to cause the valve portions to attain the closed position, a control device which is connected to the drive mechanism and responds to a user stimulus when the valve portions are in the closed position by causing the drive mechanism to bring the valve portions to the open position and subsequently causing the drive mechanism to bring the valve portions towards the closed position, the control device responding to said control signal by causing the drive mechanism to bring the valve portions towards the open position and subsequently towards the closed position.

2. A vacuum toilet system according to claim 1, further comprising tank means defining an interior space that is in communication with the interior space of the sewer pipe, and a vacuum blower connected to the tank means for establishing a pressure in the interior space of the tank means that is lower than the pressure in the interior space of the waste-receiving bowl, and wherein the control device is connected to the blower for activating the blower in response to a user stimulus and, in the event that the control device receives said control signal, maintaining the blower in its activated condition at least until the control device has responded to said control signal by causing the drive mechanism to bring the valve portions towards the open position and subsequently towards the closed position.

3. A vacuum toilet system according to claim 1, comprising a rinse water valve for controlling supply of rinse water to the waste-receiving bowl, and wherein the control device is connected to the rinse water valve and responds to a user stimulus by opening the rinse water valve and subsequently closing the rinse water valve before the valve portions of the discharge valve have been brought to the closed position.

4. A vacuum toilet system according to claim 1, wherein said valve portions comprise a valve housing that defines a passageway for providing communication between the outlet of the waste-receiving bowl and the sewer pipe, and a closure member that is mounted in the valve housing and is formed with an aperture, the closure member being rotatable between an open position in which the aperture is aligned with the passageway defined by the valve housing and a closed position in which the aperture is angularly spaced from the passageway.

5. A vacuum toilet system according to claim 4, wherein the closure member is a body of rotation having a peripheral surface that is circularly symmetrical about a predetermined axis, the closure member being mounted in the valve housing in a manner permitting rotation of the closure member relative to the valve housing about said predetermined axis and preventing displacement of the closure member relative to the valve housing.

6. A vacuum toilet system according to claim 5, wherein the closure member is a disc.

7. A vacuum toilet system according to claim 4, wherein the valve is oriented so that when the closure member is rotated from the closed position to the open position, the aperture first provides communication between the outlet of the waste-receiving bowl and the sewer pipe by way of a portion of the passageway that is close to the bottom of the passageway.

8. A vacuum toilet system comprising a waste-receiving bowl defining an interior space for receiving waste material and having an outlet, a sewer pipe defining an interior space that can be placed at a pressure that is lower than that in the interior space of the waste-receiving bowl, and a discharge valve connected between the sewer pipe and the outlet of the waste-receiving bowl for controlling passage of material between the waste-receiving bowl and the sewer pipe, the discharge valve comprising a valve housing that defines a passageway for providing communication between the outlet of the waste-receiving bowl and the sewer pipe, and a closure member that is mounted in the valve housing and defines an aperture, said closure member being rotatable relative to the valve housing between an open position in which the aperture is aligned with the passageway defined by the valve housing and a closed position in which the aperture is angularly spaced from the passageway.

9. A vacuum toilet system according to claim 8, wherein the closure member is a body of rotation having a peripheral surface that is circularly symmetrical about a predetermined axis, the closure member being mounted in the valve housing in a manner permitting rotation of the closure member relative to the valve housing about said predetermined axis and preventing displacement of the closure member relative to the valve housing.

10. A vacuum toilet system according to claim 9, wherein the closure member is a disc.

11. A vacuum toilet system according to claim 8, comprising a motor for driving the closure member selectively in opposite directions to open and close the valve, the closure member being coupled to the motor through an angularly-movable member, and the system further comprising first and second limit switches that are respectively engaged when the closure member arrives in the open position and in the closed position.

12. A vacuum toilet system according to claim 11, further comprising control means for controlling operation of the motor, the control means comprising switch means for supplying current to drive the motor and having a first state in which the motor is driven in the direction to rotate the closure member towards the open position and a second state in which the motor is driven in the direction to rotate the closure member towards the closed position, the first and second limit switches being connected to the control means and the control means being responsive to engagement of the first limit switch to place the switch means in the second state and responsive to engagement of the second limit switch to place the switch means in the first state.

13. A vacuum toilet system according to claim 8, wherein the discharge valve is oriented so that when the closure member is rotated from the closed position to the open position, the aperture first provides communication between the outlet of the waste-receiving bowl and the sewer pipe by way of a portion of the passageway that is close to the bottom of the passageway.

14. A vacuum toilet system comprising a waste-receiving bowl defining an interior space for receiving waste material and having an outlet, a sewer pipe defining an interior space that can be placed at a pressure that is lower than that in the interior space of the waste-receiving bowl, an electrically-operated discharge valve connected between the sewer pipe and the outlet of the waste-receiving bowl for controlling passage of material between the waste-receiving bowl and the sewer pipe, an electrically-operated rinse water valve for controlling supply of rinse water to the waste-receiving bowl, and control means connected to the discharge valve and to the rinse water valve and responsive to a user stimulus to cause operating current to be supplied to the rinse water valve to open the rinse water valve, cause supply of operating current to the rinse water valve to be interrupted, and subsequently to cause operating current to be supplied to the discharge valve.

* * * * *

REEXAMINATION CERTIFICATE (2891st)

United States Patent [19]
Oldfelt et al.

[11] B1 4,713,847
[45] Certificate Issued May 28, 1996

[54] VACUUM TOILET SYSTEM

[75] Inventors: Sven Oldfelt, Vaxholm; Sigvard Söderström, Hägersten, both of Sweden

[73] Assignee: Oy Wartsila AB, Helsinki, Finland

Reexamination Request:
No. 90/002,831, Sep. 8, 1992

Reexamination Certificate for:
Patent No.: 4,713,847
Issued: Dec. 22, 1987
Appl. No.: 9,709
Filed: Feb. 2, 1987

[51] Int. Cl.$^6$ .................. B64D 11/02; E03D 11/00
[52] U.S. Cl. .................. 4/316; 4/317; 4/431; 4/434; 251/61.1; 251/129.12; 137/192; 137/205
[58] Field of Search .................. 4/300, 316, 321–323, 4/431–439, 441; 137/205, 624.18; 251/129.11, 129.12, 304, 129.04

[56] References Cited

U.S. PATENT DOCUMENTS

| | | | |
|---|---|---|---|
| 1,822,319 | 9/1931 | Schwarz | 4/432 |
| 2,851,648 | 9/1958 | Reger | 251/129.12 X |
| 3,418,664 | 12/1968 | Carmichael et al. | |
| 3,482,267 | 12/1969 | Liljendahl | |
| 3,505,888 | 4/1970 | Denkowski | 251/129.11 X |
| 3,608,866 | 9/1971 | Karpacheva | 259/1 |
| 3,628,194 | 12/1971 | Lilgendahl | 4/10 |
| 3,654,953 | 4/1972 | Hagdom | 137/395 |
| 3,695,284 | 10/1972 | Wallgren | 137/188 |
| 3,700,085 | 10/1972 | Balz | 251/129.12 X |
| 3,730,884 | 5/1973 | Burns et al. | 210/15 |
| 3,746,032 | 7/1973 | Wallgren | 137/205 |
| 3,760,837 | 9/1973 | Amren | 137/398 |
| 3,777,778 | 12/1973 | Janu | 137/487 |
| 3,788,338 | 1/1974 | Burns | 137/1 |
| 3,807,431 | 4/1974 | Svanteson | 137/205 |
| 3,862,739 | 1/1975 | Fujiwara | 251/130 |
| 3,972,506 | 8/1976 | Azuma | 251/129.11 |
| 3,998,736 | 12/1976 | Greenleaf, Jr. | 210/104 |
| 4,120,312 | 10/1978 | Michael | 137/236 |
| 4,171,853 | 10/1979 | Cleaver et al. | 406/48 |
| 4,179,371 | 12/1979 | Foreman et al. | 210/63 R |
| 4,184,506 | 1/1980 | Varis et al. | 137/205 |
| 4,188,968 | 2/1980 | Trobaugh et al. | 137/236 R |
| 4,209,034 | 6/1980 | Michael | 137/236 R |
| 4,258,747 | 3/1981 | Trobaugh | 137/488 |
| 4,285,359 | 8/1981 | Doherty | 137/205 |
| 4,297,751 | 11/1981 | Olin et al. | 4/431 |
| 4,373,838 | 2/1983 | Foreman et al. | 406/14 |
| 4,463,930 | 8/1984 | Vamvakas | 251/134 |
| 4,587,989 | 5/1986 | Mayhew, Jr. | 137/375 |
| 4,596,377 | 6/1986 | Taylor | 251/248 |
| 4,603,709 | 8/1986 | Huisma | 137/205 |
| 4,693,447 | 9/1987 | Perez | 4/323 X |

FOREIGN PATENT DOCUMENTS

| | | |
|---|---|---|
| 2256292 | 7/1975 | France .................. E03C 1/122 |
| 2441776 | 6/1980 | France . |
| 2556097 | 6/1976 | Germany . |
| 51331 | 12/1919 | Sweden . |
| 326869 | 8/1970 | Sweden . |
| 8207173 | 6/1984 | Sweden . |
| 2090375 | 7/1982 | United Kingdom . |

*Primary Examiner*—Charles E. Phillips

[57] ABSTRACT

A vacuum toilet system comprises a waste-receiving bowl having an outlet, a sewer pipe that can be placed at a pressure that is lower than that in the interior of the waste-receiving bowl, and a discharge valve connected between the sewer pipe and the outlet of the waste-receiving bowl for controlling passage of material from the waste-receiving bowl to the sewer pipe. The discharge valve comprises a valve housing and a closure member. The closure member is movable relative to the valve housing between an pen position and a closed position. A drive mechanism is connected to the closure member for bringing about movement thereof relative to the valve housing. A sensing device provides a control signal in the event that the drive mechanism is not able to cause the closure member to attain its closed position. A control device is connected to the drive mechanism and responds to a user stimulus by causing the drive mechanism to move the closure member from its closed position to its open position and subsequently from its open position towards its closed position. The control device responds to a control signal provided by the sensing device by causing the drive mechanism to move the closure member towards its open position and subsequently towards its closed position.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–7 and 11–14 is confirmed.

Claims 8–10 are cancelled.

\* \* \* \* \*